United States Patent [19]

Borchardt

[11] Patent Number: 4,856,588

[45] Date of Patent: Aug. 15, 1989

[54] SELECTIVE PERMEABILITY REDUCTION OF OIL-FREE ZONES OF SUBTERRANEAN FORMATIONS

[75] Inventor: John K. Borchardt, Houston, Tex.

[73] Assignee: Shell Oil Company, Houston, Tex.

[21] Appl. No.: 194,658

[22] Filed: May 16, 1988

[51] Int. Cl.$^4$ .................... E21B 43/22; E21B 33/138; E21B 43/267

[52] U.S. Cl. .................................. 166/273; 166/274; 166/275; 166/294; 166/308; 166/309; 252/8.554

[58] Field of Search ............... 166/246, 273, 274, 275, 166/294, 305.1, 309; 252/8.554

[56] References Cited

U.S. PATENT DOCUMENTS

| | | | |
|---|---|---|---|
| 3,342,256 | 9/1967 | Bernard et al. | 166/273 |
| 3,369,601 | 2/1968 | Bond et al. | 166/273 X |
| 3,710,861 | 1/1973 | Ver Steeg | 166/273 |
| 4,286,660 | 9/1981 | Wagner et al. | 166/246 |
| 4,380,266 | 4/1983 | Wellington | 166/273 X |
| 4,528,106 | 7/1985 | Grolitzer | 166/275 X |
| 4,582,137 | 4/1986 | Schmitt | 166/294 X |
| 4,683,074 | 7/1987 | Malik et al. | 252/136 |
| 4,706,752 | 11/1987 | Holm | 166/273 |

OTHER PUBLICATIONS

Wellington et al, CT Studies of Surfactant-Induced $CO_2$ Mobility Control (SPE 14393), SPE Conference, Sep. 22-25, 1985.

Borchardt et al, Surfactants for $CO_2$ Foam Flooding (SPE 14394), SPE Conference, Sep. 22-25, 1985.

Primary Examiner—George A. Suchfield

[57] ABSTRACT

The mobility of fluids in substantially oil-free zones of subterranean formations is controlled by introducing a composition comprising (a) water, (b) a fluid component selected from the group consisting of carbon dioxide, nitrogen, $C_1$ to $C_3$ hydrocarbons, and mixtures thereof, and (c) one or more polysaccharide surfactants of the formula $RO(R^1O)_xSacc_z$, wherein R is a monovalent organic radical having a carbon number in the range from about 7 to 24; $R^1$ represents a divalent hydrocarbon radical containing from about 2 to 4 carbon atoms; x is a number having an average value in the range from 0 to about 12; and $Sacc_z$ represents an average number z between about 0.7 and 10 of moieties derived from reducing saccharides containing 5 or 6 carbon atoms. The resulting mixture of components (a), (b), and (c) forms a dispersion, or a "foam" as that term is commonly used in the art, which is resistant to fluid flow.

In certain preferred embodiments, the invention is applied to a formation having both one or more zones of high oil saturation and one or more zones which are substantially free of oil. In such embodiments, the process accomplishes a selective reduction of the permeability of a subsequently injected oil displacement or drive fluid into and through the substantially oil-free zones, without significantly reducing mobility of the drive fluid flow into and through the zones having meaningfully high oil saturation.

22 Claims, No Drawings

SELECTIVE PERMEABILITY REDUCTION OF OIL-FREE ZONES OF SUBTERRANEAN FORMATIONS

This invention relates to a process for controlling the mobility of the flow of certain fluids within a subterranean formation, which comprises introducing into the formation a composition comprising water, a fluid which may be a gas or a supercritical fluid, and a surfactant component selected from a certain class of polysaccharide compounds. In certain particularly important embodiments, this invention relates to an improved process for the recovery of oil from a formation which has both zones of high oil saturation and zones substantially free of oil. When present in the substantially oil-free zones, the specified polysaccharide compositions function to selectively reduce the permeability of these zones, without plugging high oil-saturation zones of the formation.

In one specific respect, this invention relates to a process in which the surfactant composition is introduced into a subterranean formation. It is well known in conventional practice to introduce surfactants into subterranean formations, most typically in connection with oil recovery operations. As a rule, the surfactants are applied in aqueous solution to accomplish a desired function in the presence of the oil, particularly at an interface between an aqueous surfactant solution and the oil. For instance, many processes have been suggested in which surfactants are added to the formation to facilitate the movement of the oil through, and thus enhance its recovery from, the formation.

In one particular example of such a process, it is known to utilize surfactants in enhanced oil recovery processes in which an aqueous liquid (often in combination with another material such as carbon dioxide, nitrogen, natural gas or the like) is injected into subterranean formations to invade and drive oil from porous rocks. In the practice of this process, it is generally thought that the surfactant-containing mixture should propogate as a front through oil containing zones of the formation to sweep oil from these zones. In this respect, a number of investigations have been made of surfactants which form viscous, stable aqueous dispersions in the presence of oil.

The present invention, however, relates to a process utilizing a surfactant which, in aqueous solution, is found to be incapable of forming viscous, stable dispersions in the presence of oil.

In another specific respect, the present invention relates to the introduction of a surfactant composition into a substantially oil-free zone of an underground formation. Such zones may be found as natural aquifers (fresh water or brine) in the formation, or they may have resulted from previous oil-recovery operations. For instance, water flood or water or steam drive processes for oil recovery leave "watered-out" zones in the formation, particularly near an injection well and in channels through the formation rock. Similarly, other oil recovery processes may leave other fluids, e.g., $CO_2$, $H_2$, etc., in pockets within the formation. Water "coning" may occur near oil production wells, as water from adjacent rock zones is drawn into oil-bearing zones and production channels resulting in a decrease in oil production and an increase in water production from the formation. This invasion of water from adjacent zones may continue until no oil is being produced, even though substantial oil saturation exists at points in the formation further from the production well.

In still another specific respect, this invention relates to a process for the "plugging" of the substantially oil-free zones of a reservoir, by controlling (i.e., reducing) the mobility of fluid flow into and through these zones. (The term mobility, as applied to a fluid flow through such a zone, represents the ratio of (i) the permeability of the fluid through the zone to (ii) the fluid viscosity. Permeability is a measure of fluid conductivity, i.e., the fluid transmitting capability of, say, the rock in a subterranean reservoir.) The zones of a formation which contain water, $CO_2$, $H_2$, and the like are typically very permeable to the flow of oil-recovery fluids. The ease of fluid flow through substantially oil-free zones is often of great disadvantage. For example, a drive process applied to recover oil from a high oil saturation zone elsewhere in the formation may produce water or brine from an aqueous, substantially oil-free zone, preferentially to the desired production of the oil. In this example, the high mobility of a drive fluid into and through the aqueous zone diverts the drive fluid from its intended duty in the oil containing zone, lowering process efficiency and increasing process costs. In conventional practice, expensive physical treatments involving special downhole tools and polymer injections have been used to isolate the aqueous zones of a formation prior to secondary recovery treatments of the oil-containing zones. A chemical process capable of plugging aqueous zones in a subterranean formation would be highly desirable. Even more desirable for application in conjunction with operations for the recovery of oil from the formation would be a process which is selective in its ability to control fluid mobility in the aqueous zones of the formation without significantly reducing the mobility of fluid flow into and through oil-containing zones of the formation.

In a final respect, this invention relates to a process wherein the surfactant introduced into the aqueous zone of the subterranean formation is selected from a certain class of polysaccharide compounds. The polysaccharides are nonionic surfactants which are generally known for use as components of laundry detergents, personal cleaning products, dishwashing formulations, fire fighting foams, ore mining and treatment solutions, etc. Suggestions in the prior art for use of alkyl polysaccharides in oil production have been largely limited to use as a component of oil well drilling fluids, that is, the fluids circulated down a well bore during actual drilling to cool the drill bit and suspend and transport rock cuttings to the surface. U.S. Pat. No. 4,683,074 has recently described the use of certain mixtures of monoglycoside and polyglycoside components in acidic compositions said to be useful, for instance, in metal and porcelain cleaner formulations and in formulations for oil well acidizing or fracturing.

SUMMARY OF THE INVENTION

It has now been found that certain polysaccharide surfactant containing compositions are very effective in controlling the mobility of fluids within substantially oil-free zones of subterranean formations.

Accordingly, in broad terms the invention can be briefly described as a process for enhancing control over the mobility of fluids in a substantially oil-free zone of a subterranean formation, which comprises introducing into the zone a composition comprising (a) water, (b) a fluid component selected from the group consisting of carbon dioxide, nitrogen, $C_1$ to $C_3$ hydrocarbons, and mixtures thereof, and (c) one or more polysaccharide surfactants of the formula $RO(R^1O)_xSacc_z$, wherein R is a monovalent organic radical having a carbon number in the range from about 7 to 24; $R^1$ represents a divalent hydrocarbon radical containing from about 2 to about 4 carbon atoms; x is a number having an average value in the range from 0 to about 12.0; and $Sacc_z$ represents an average number z of moieties derived from reducing saccharides containing 5 or 6 carbon atoms. R preferably represents an alkyl, alkylphenyl, hydroxyalkyl phenyl, or hydroxyalkyl moiety having a carbon number in the range from about 8 to about 20; the optional ($R^1O$) group is (when present) preferably an oxyethylene group; x is preferably between about 0 and 8.0, and is most preferably 0; Sacc preferably represents a glucose, galactose, glucosyl or galactosyl residue, and most preferably represents a glucose residue; and z is suitably between about 0.7 and 10.0, and is most preferably between about 1.3 and 4.0. The resulting mixture of components (a), (b), and (c) forms a dispersion, or a "foam" as that term is commonly used in the art, which is resistant to fluid flow.

The manner in which the specified composition is introduced into the subterranean zone is not critical to the practice of the process. In this regard, the composition is suitably pre-formed from the three necessary components and then injected into the formation. Alternatively, and in many cases preferably, one or more of the components can be separately introduced into the formation and the composition formed in situ. Thus, for example, in a particularly preferred embodiment, an aqueous solution of the polysaccharide surfactant is first injected into the formation followed by injection of the $CO_2$, $N_2$ or hydrocarbon component.

In one particularly important embodiment, introduction according to this invention of the polysaccharide surfactant composition into a formation having both one or more zones of high oil saturation and one or more zones which are substantially free of oil is found to accomplish a selective reduction of the permeability of the substantially oil-free zones to a subsequently injected oil displacement or drive fluid without significantly reducing mobility of the drive fluid flow into and through the zones having meaningfully high oil saturation. The selective mobility control which the the surfactant composition provides in this process is in direct contrast to the use in many prior art processes of surfactants to alter fluid flow properties at an oil/water interface. In this particular embodiment, the invention can be described in summary as an improved process for the recovery of oil from a subterranean formation having both a zone of high oil saturation and a zone substantially free of oil, which comprises a step for flowing through the formation a drive fluid into and through the high oil saturation zone, wherein the improvement comprises (a) a step for introducing into the substantially oil-free zone a composition comprising (a) water, (b) a component selected from the group consisting of carbon dioxide, nitrogen, $C_1$ to $C_3$ hydrocarbons, and mixtures thereof, and (c) one or more polysaccharide surfactants of the formula $RO(R^1O)_xSacc_z$, wherein R, $R^1O$, Sacc, x, and z are as herein above defined, which is followed by (b) a step for flowing the drive fluid through the formation.

In this embodiment, the specified polysaccharide composition selectively plugs the substantially oil-free zone, without significantly reducing the mobility of the drive fluid through, and the oil from, the zone of high oil saturation.

In another particular embodiment, polysaccharide surfactant compositions are introduced into the formation as components of aqueous hydraulic fracturing fluids to enhance the effective viscosity of the fluid, for instance, to increase the fluids capacity for carrying suspended solid particulates into fractures within the formation.

DESCRIPTION OF THE PREFERRED EMBODIMENTS

The present invention can generally be applied to treatment of any subterranean formation wherein it is desired to obtain control over the mobility of fluids substantially free of oil. Oil, as the term is used herein, is understood to include petroleum and other liquid hydrocarbons. For purposes of describing the invention, mobility control is considered to be accomplished over one or more substantially oil-free "zones" of the formation, which, in certain embodiments of the invention, are distinguished from other formation zones which have a meaningfully high oil saturation and thus are not substantially oil-free. (As a general rule, the substantially oil-free zones of a formation which are treated under practice of this invention are those in which oil occupies less than about 15 percent of the pore volume, preferably less than about 5 percent of the pore volume.)

The substantially oil-free zones may be naturally present in the formation, e.g., a naturally occurring water (or brine) deposit, or a zone which has been created in operations carried out on the formation, e.g., a channel in the formation which has resulted from water flood or steam or other gas drive processes for enhanced oil recovery. Mobility control over a fluid, as the terminology is used in this specification, refers to increasing the effective resistance of the fluid to flow. In some cases, the same affect is referred to as a plugging (although not necessarily a complete plugging) of a substantially oil-free zone in the formation.

The mobility control function of this invention is provided by an introduction into one or more substantially oil-free zones of the formation of the specified combination of (a) water, (b) a component selected from the group consisting of supercritical carbon dioxide and gaseous carbon dioxide, nitrogen and $C_1$ to $C_3$ hydrocarbons, and mixtures thereof, and (c) one or more of certain polysaccharide surfactants.

One component of the composition is suitably one or a mixture of the materials: (i) supercritical carbon dioxide, (ii) gaseous carbon dioxide, (iii) gaseous nitrogen, and (iv) gaseous hydrocarbons having carbon numbers in the range from 1 to 3, inclusive. It shall be understood that carbon dioxide may suitably be present in the mixture in either the gaseous or supercritical state (at conditions within the formation). Nitrogen and the $C_1$ to $C_3$ hydrocarbons are in the gas state at conditions found in formations to which the invention may be usefully applied, i.e., pressures up to about 3000 psig and temperatures up to about 100° C. Preferably, this component is selected from the group consisting of carbon dioxide (either gaseous or supercritical) and nitrogen, while the use of carbon dioxide is considered most preferred.

In general, the polysaccharide surfactant component suitable for use in the invention can be one or a mixture of compounds represented by the formula $RO(R^1O)_x$-$Sacc_z$. The hydrophobic R substituent in this formula represents a molovalent organic radical having a carbon number in the range from about 7 to 24. Preferred for use in the practice of the invention are polysaccharides wherein the hydrophobic R group of the molecule is an alkyl, alkylphenyl, hydroxyalkylphenyl, or hydroxyalkyl group. Preference can also be expressed for R substituents having carbon numbers in the range from about 8 to 20, while an R group in the $C_9$ to $C_{15}$ range is more preferred and an R group in the $C_9$ to $C_{11}$ range is considered most preferred. In the case of hydroxyalkyl and hydroxyalkylphenyl groups, R may contain up to about 3 hydroxy groups. The R group may have a branched-chain structure, but is preferably of linear carbon chain structure. It is often the case that commercially prepared polysaccharide products are comprised of mixtures of molecules characterized by R groups within a range of carbon numbers and having different structures. Such mixtures are very suitable for purposes of this invention.

The $R^1$ divalent hydrocarbon radical suitably has a carbon number in the range of from about 2 to 4. Preferably, each ($R^1O$) unit represents an oxyethylene or oxypropylene radical, and is most preferably an oxyethylene radical. The $(R^1O)_x$ moiety is an optional substituent of the surfactant molecule which may be present as a link between the hydrophobic R moiety and the hydrophylic polysaccharide moiety. The number x of oxyalkylene substituents, which typically represents an average of a range of individual interger values, is suitably between about 0 and 12.0, and is preferably 0. When x is not 0, it is preferably between about 2.5 and 8.0, and more preferably between about 2.5 and 5.0.

The polysaccharides are typically prepared as mixtures of molecules having different numbers of added hydrophilic saccharides units, i.e., different values of z in the above formula. For this reason, the number of saccharide units in the product molecules is best expressed as an average value. Preference can be stated for use in this invention of polysaccharides having an average number of saccharide units in the range from about 0.7 to 10.0, while an average number of saccharide units per molecule which is in the range from about 1.0 to 6.0 is considered more preferred and an average number of saccharide units per molecule which is in the range from about 1.3 to 4.0 is considered most preferred.

The saccharide unit Sacc is derived from a reducing saccharide containing 5 or 6 carbon atoms. For example, each Sacc may be a glucoside, galactoside, fructoside, glucosyl, galactosyl, or fructosyl group. Preferably, Sacc is a glucose, galactose, glucosyl, galactosyl residue; more preferably Sacc represents a glucose residue.

Polysaccharide surfactants useful in this invention also include those in which one or more of the normally free (i.e., unreacted) hydroxyl groups of a saccharide moiety Sacc have been alkoxylated, resulting in one or more pendant alkoxy or polyalkoxy groups in place of the hydroxyl group(s). Preferably, the added alkoxy or polyalkoxy groups are oxyethylene or oxypropylene groups, or mixed oxyethylene/oxypropylene groups. The surfactant may suitably contain an average of from 0 to about 20 mols (preferably 0 to 10 mols) of such pendant oxyalkylene units per mole of saccharide moiety S (i.e., per unit value of z).

A particularly preferred group of polysaccharide surfactants suitable for use in this invention includes those of the above formula for which R is an alkyl or alkylphenyl radical having from about 9 to 15 carbon atoms, x is zero, Sacc is glucose, and z is a number having an average value of from about 1.3 to 4.0.

Polysaccharides are conventional materials, which can be prepared by methods well known in the art. Polysaccharides wherein the S moiety is characterized by pendant oxyalkylene chains are described in U.S. Pat. No. 4,528,106.

For purposes of practicing the invention, the combination of these three—water, gas (or supercritical $CO_2$) and surfactant—components is introduced into zone(s) of the formation where mobility control is desired. Introduction of the mixture is intended to encompass not only injection into the zone of a prepared three-component mixture but also any other means by which the specified mixture is formed in situ in the formation. Thus, for example, the three components can be injected singly or in various two-component combinations, with the mixture then being formed in place in the formation. In some cases, either the water or the gas component may be already be present within the zone in which mobility control is desired. The requirement for introduction of the plugging composition into the formation is then satisfied simply by supplying surfactant and gas or water as necessary to form the three-component mixture in situ. Should water and gas components both be available within the formation, introduction of the composition may simply require injection of surfactant into the formation (together with sufficient water or other solvent as necessary to reduce surfactant viscosity and permit injection at a meaningful rate).

It is generally most convenient to inject the surfactant in solution in an aqueous diluent, e.g., a solution containing at least about 0.05% w percent by weight) alkyl polysaccharides, calculated on water. The polysaccharide is also suitably introduced as a solution in a diluent other than water, provided the diluent is essentially free of oil.

As a general rule, the surfactant may be most economically and effectively applied in such an amount as to produce, at a point in the aqueous zone in the formation where mobility control is desired, an aqueous solution having a concentration of between about 0.1 and 2% w (calculated on the combined weight of water plus polysaccharide) although compositions within a broader range of surfactant content, for instance, 0.05% w to 5.0% w are also considered suitable. The composition more preferably has a surfactant concentration between about 0.25 and 0.75% w and most preferably a concentration of about 0.5% w. The gas component is suitably applied such a quantity that the resulting three-component mixture forms an emulsion or dispersion providing the desired mobility control. The relative quantities of gas or supercritical fluid component and aqueous phase are not narrowly critical to the invention and can be adjusted for the desired degree of mobility control. Preferably, however, the composition used in the invention is characterized by a volume ratio of the gas or supercritical fluid component to the liquid water and surfactant mixture which in the range of from about 0.1:1 to 100:1, more preferably in the range from about 0.5:1 to 10:1 and is most preferably in the range from about 1:1 to 5:1. When the invention is practiced in conjunction with oil recovery from zones of high oil saturation in the formation, using a gas or supercritical fluid which serves as both the drive fluid for oil recovery and the gas/supercritical fluid component of the polysaccharide composition, the relative ratio of the gas/supercritical fluid to the aqueous phase in the composition introduced into the substantially oil-free zones can be controlled, by varying the injection quantities, for control over the efficiency of the overall process from the standpoint of oil and water production from the formation.

The composition may suitably contain minor amounts of materials other than the three necessary components, again with the restriction that the resulting composition be substantially oil-free. For instance, the composition may suitably contain significant amounts of alkali metal (e.g., sodium and potassium) and alkaline earth metal (e.g., calcium) salts. In this respect, brines (such as may be naturally present in or co-produced from a formation in connection with oil recovery) may conveniently be used as diluents for injection of solutions of the alkyl polysaccharides. Similarly, the invention is very suitably applied to control mobility within a zone containing a (substantially oil-free) brine solution.

The tolerance of the polysaccharide component to the presence of salts is considered a surprising aspect of the invention, particularly the salt tolerance of the surfactants under the high temperature conditions often encountered in deep oil-containing formations. Moreover, the surfactants remain stable at low pH, i.e., a pH in the range from about 1 to about 7. The pH tolerance of the surfactants is particularly important when carbon dioxide is employed as the gas component of the composition. Stability of the surfactants under adverse conditions prolongs the effectiveness of the mobility control treatment. Still further, the specified polysaccharides are unique among nonionic surfactants in terms of their solubility in water and brines at the elevated temperature often encountered in the formation. The solubility of the polysaccharides in meaningful concentration in water or brine at elevated temperature is a necessary factor in their successful performance in this invention.

The invention is considered particularly useful in embodiments wherein it is practiced in combination with an oil recovery drive process in which a fluid is injected into a formation to displace, or drive, oil from zones of the formation characterized by relatively high oil saturation. The invention is applied in this context to reduce the mobility of the drive fluid into and through other zones of the formation which are substantially oil-free. In such embodiments, the invention accomplishes a selective permeability reduction in the zones substantially free of oil, without significantly reducing mobility of the drive fluid flow into and through the zones having meaningfully high oil saturation.

One such process embodiment is illustrated by application of the invention to reduce the permeability of aqueous zones of a formation, prior to initiating a drive process for oil recovery. Aqueous, essentially oil-free channels, extending from an injection well to one or more production wells, are commonly present in formations which have previously been subjected to water flood and/or steam drive processes. In the practice of this embodiment of the invention, an aqueous solution of the polysaccharide, for instance a solution containing about 0.5% w of the surfactant, is injected into the formation, e.g., through an existing injection well, in such quantity that it will displace other aqueous liquids from the channels, or those portions of the channels, for which plugging is desired. Injection of the aqueous polysaccharide solution is followed by injection of the specified gas or supercritical $CO_2$ component of the mobility control composition. This component may be injected either alone, or in admixture with other fluids, e.g., water or aqueous solutions. Finally, injection of the drive fluid is commenced at the injection well. The drive fluid is suitably water or brine, an aqueous surfactant solution, a caustic solution, a polymer solution, or the like, either alone or in combination with a gas or supercritical $CO_2$ component. In particularly preferred embodiments, the drive fluid, as well as the mobility control composition, comprises a gas component selected from the group consisting of carbon dioxide, nitrogen, $C_1$ to $C_3$ hydrocarbon, and mixtures thereof. In such cases, the subsequent drive fluid injection functions to supply all or part of the gas or supercritical $CO_2$ component for formation of the necessary three-component mobility control composition. Examples of drive processes for oil recovery which are very suitably applied in conjunction with the invention are described, for instance, in U.S. Pat. Nos. 3,342,256; 4,380,266; and 4,502,538. The invention is not intended for application in conjunction with a drive process which utilizes steam as the drive fluid.

The invention is further illustrated through reference to the following examples and comparative experiments. The examples describe certain preferred aspects of the invention, and are not intended to restrict its broader scope.

Each of the following examples utilizes a standard test procedure to evaluate the performance of polyglycoside surfactants in mobility control applications. The performance of a surfactant in this foam test has been shown to provide reliable prediction of the surfactant's performance in reducing the mobility of supercritical carbon dioxide, nitrogen and other gases within subterranean formations and of the effect of oil phases on such mobility reduction.

The test simulates the ability of the surfactant to form dispersions in brine which are capable of both establishing and maintaining mobility control. (J. K. Borchardt et al, "Surfactants for $CO_2$ Foam Flooding," Paper No. SPE 14394 and S. L. Wellington et al., "CT Studies of Surfactant-Induced Mobility Control," Paper No. SPE 14393, both presented at the Sixtieth Annual Technical Conference of the Society of Petroleum Engineers of AIME, Sept. 22-25, 1985.) For each test, 10 cc of a 0.5% w aqueous brine solution of the surfactant to be tested were placed in a clean tared graduated cylinder. The headspace was flushed with $CO_2$ to remove air. The tube was sealed, shaken for thorough mixing, and then placed in a water bath and allowed to equilibrate at the selected test temperature. After equilibration, the samples were then shaken again (in a controlled, reproducible manner) and foam volume determined (and reported in terms of cc volume) as a function of time. The values for foam volumes which result are an indication of the relative mobility reduction obtainable in rock zones. The greater the volume of foam, the more the mobility of an injected gas or supercritical fluid for oil displacement will be reduced.

EXAMPLE 1

Four samples of polysaccharide surfactants were screened as mobility control agents in an aqueous brine/CO$_2$ compositions, using the standard test procedure.

For purposes of these tests, the brine contained 10.55% w sodium chloride, 1.84% w calcium chloride hydrate, and 0.28% w magnesium chloride hydrate. Tests were performed at room temperature (23° C.).

The polysaccharide surfactants used in the four tests (designated a, b, c and d, respectively) are characterized as follows:

a. a mixture of molecules having substantially linear alkyl R groups in the C$_9$ to C$_{11}$ range and an average of one glycoside group per molecule;
b. a mixture of molecules having substantially linear alkyl R groups in the C$_9$ to C$_{11}$ range and an average of three glycoside groups per molecule;
c. a mixture of molecules having substantially linear alkyl R groups in the C$_{12}$ to C$_{13}$ range and an average of one glycoside group per molecule;
d. a mixture of molecules having substantially linear alkyl R groups in the C$_{12}$ to C$_{13}$ range and an average of three glycoside groups per molecule.

Foam volumes were measured over time to determine their stability. The results, presented in Table 1, show that compositions according to this invention are capable of forming the desired foaming dispersions and of maintaining the effectiveness of mobility control over time.

TABLE 1

| surfactant | foam volume after | | | |
|---|---|---|---|---|
| | 1 min. | 5 min. | 10 min. | 15 min. |
| a | 20.5 | 19.2 | 18.6 | 17.0 |
| b | 21.5 | 20.4 | 19.3 | 18.7 |
| c | 12.0 | 10.3 | 10.0 | 9.9 |
| d | 19.6 | 17.6 | 16.9 | 16.7 |

EXAMPLE 2

This example illustrates the selectivity of the polysaccharide surfactant compositions for mobility control only in aqueous media substantially free of oil. Compositions containing the four surfactants described Example 1 were screened in tests carried out in the same aqueous brine, to which had been added either 30% v of decane ("D") or 30% v of a 1:1 by volume mixture of decane and toluene ("D/T"). The decane or decane/toluene mixture served as models for crude oils. Other than with respect to the initial addition of the decane and toluene to the cylinder, the tests were carried out using the procedures described in Example 1.

The results for these tests, presented in Table 2, show that the surfactants do not form dispersions which will effectively plug oil-containing channels in the reservoir. The data from the tests of Example 1 (no oil phase) are included in Table 2 for comparison. The selectivity of the polysaccharide properties in the media free of oil is evident from this comparison, both in initial foam volume and in stability over time.

TABLE 2

| surfactant | oil phase | foam volume after | | | |
|---|---|---|---|---|---|
| | | 1 min. | 5 min. | 10 min. | 15 min. |
| a | none | 20.5 | 19.2 | 18.6 | 17.0 |
| a | D | 10.8 | 6.2 | 2.4 | 0 |
| a | D/T | 7.4 | 1.1 | 0.9 | 0 |
| b | none | 21.5 | 20.4 | 19.3 | 18.7 |
| b | D | 14.6 | 12.8 | 11.7 | 8.0 |
| b | D/T | 11.6 | 9.0 | 6.0 | 4.5 |
| c | none | 12.0 | 10.3 | 10.0 | 9.9 |

TABLE 2-continued

| surfactant | oil phase | foam volume after | | | |
|---|---|---|---|---|---|
| | | 1 min. | 5 min. | 10 min. | 15 min. |
| c | D | 0 | 0 | 0 | 0 |
| c | D/T | 0 | 0 | 0 | 0 |
| d | none | 19.6 | 17.6 | 16.9 | 16.7 |
| d | D | 7.8 | 7.3 | 7.2 | 5.0 |
| d | D/T | 7.8 | 7.0 | 6.8 | 3.4 |

EXAMPLE 3

Evaluations were made of the four compositions tested in Examples 1 and 2 at a temperature of 75° C. The tests of this example were otherwise carried out under the same procedures as those described above, both in aqueous media and in media containing decane or decane and toluene.

The results, presented in Table 3, again illustrate the capabilities of the polysaccharide surfactants for selective mobility control in a medium substantially free of oil.

TABLE 3

| surfactant | oil phase | foam volume after | | |
|---|---|---|---|---|
| | | 1 min. | 5 min. | 10 min. |
| a | none | >23.4 | 4.4 | 1.2 |
| a | D | 2.5 | 0.2 | 0 |
| a | D/T | 0 | 0 | 0 |
| b | none | >23.6 | 18.0 | 10.9 |
| b | D | 15.6 | 5.0 | 2.4 |
| b | D/T | 0.6 | 0 | 0 |
| c | none | 8.6 | 7.8 | 7.6 |
| c | D | 0 | 0 | 0 |
| c | D/T | 0 | 0 | 0 |
| d | none | >23.8 | 21.0 | 19.9 |
| d | D | 8.0 | 2.3 | 1.9 |
| d | D/T | 0.6 | 0 | 0 |

EXAMPLE 4

This example indicates that polysaccharide surfactants are chemically stable in brine solution at elevated temperature.

The surfactant/brine solutions evaluated in the tests of Example 3 were stored at a temperature of 75° C. for a period of 29 days. The pH of the solutions was 3. Foam generation and stability for these samples was evaluated at 75° C. after 1, 10 and 29 days of storage. The results are presented in Table 4.

TABLE 4

| surfactant | oil phase | 10 minute foam volume after storage for | | |
|---|---|---|---|---|
| | | 1 day | 10 days | 29 days |
| a | none | 1.2 | 4.4 | 7.0 |
| a | D | 0 | 0.4 | 0 |
| a | D/T | 0 | 0 | 0 |
| b | none | 10.9 | 11.6 | 19.0 |
| b | D | 2.4 | 3.1 | 3.1 |
| b | D/T | 0 | 0 | 0 |
| c | none | 7.6 | 7.6 | 6.3 |
| c | D | 0 | 0 | 0 |
| c | D/T | 0 | 0 | 0 |
| d | none | 19.9 | 20.5 | 19.0 |
| d | D | 1.9 | 1.7 | 1.4 |
| d | D/T | 0 | 0 | 0 |

The stability of the polysaccharide molecules, in the presence of low pH brine and at elevated temperature, is considered particularly surprising, in view of the known hydrolytic instability of other polysaccharide acetal linkages.

COMPARATIVE EXPERIMENT A

For comparison, evaluations were carried out on compositions containing alkyl polyoxyethylene surfactants. Like the alkyl polysaccharides, these alkyl polyoxyethylene surfactants are nonionic surfactants. However, they are not suitable for use in this invention.

Tests at 75° C. were run on a series of four alkyl polyoxyethylene surfactants (designated e, f, g and h, respectively) which are characterized as follows:

e. a mixture of molecules having substantially linear alkyl groups in the $C_9$ to $C_{11}$ range and an average of eight oxyethylene groups per molecule;

f. a mixture of molecules having substantially linear alkyl groups in the $C_9$ to $C_{11}$ range and an average of twelve oxyethylene groups per molecule;

g. a mixture of molecules having substantially linear alkyl groups in the $C_{12}$ to $C_{15}$ range and an average of seven oxyethylene groups per molecule;

h. a mixture of molecules having substantially linear alkYl groups in the $C_{12}$ to $C_{15}$ range and an average of eighteen oxyethylene groups per molecule.

The results of these tests of the alkyl polyoxyethylene surfactants are presented in Table 5.

TABLE 5

| surfactant | oil phase | foam volume after 10 min. |
|---|---|---|
| e | none | 0 |
| e | D | 0 |
| e | D/T | 0 |
| f | none | 0.4 |
| f | D | 0.9 |
| f | D/T | 0 |
| g | none | 0 |
| g | D | 0 |
| g | D/T | 0 |
| h | none | 0.8 |
| h | D | 0.8 |
| h | D/T | 0 |

EXAMPLE 6

A further series of evaluations was made of the properties of polysaccharide surfactant compositions over a range of temperatures and brine salt concentrations. Comparative evaluations were also made of alkyl polyoxyethylene surfactants and alkylphenol polyoxyethylene surfactants. The alkyl polysaccharide surfactants evaluated in this example are characterized in Example 1. The alkyl polyoxyethylene surfactants evaluated are characterized as follows:

i. a mixture of molecules having substantially linear alkyl groups in the $C_9$ to $C_{11}$ range and an average of eight oxyethylene groups per molecule;

j. a mixture of molecules having substantially linear alkyl groups in the $C_{12}$ to $C_{15}$ range and an average of nine oxyethylene groups per molecule;

k. a mixture of molecules having substantially linear alkyl groups in the $C_{14}$ to $C_{15}$ range and an average of thirteen oxyethylene groups per molecule.

The alkylphenol polyoxyethylene surfactants evaluated are characterized as follows:

1. the product of the addition of an average of 9 oxyethylene groups to octyl phenol;

m. the product of the addition of an average of 9 oxyethylene groups to nonyl phenol.

These evaluations were made in oil-free brine solutions having a range of salinities. Solutions having a "relative salinity" of 1.0 contained 9% w sodium chloride and 1% w calcium chloride. Solutions having a relative salinity of 0.5 contained 4.5% w sodium chloride and 0.5% w calcium chloride. Solutions having a relative salinity of 1.5 contained 13.5% w sodium chloride and 1.5% w calcium chloride.

The results of these tests, presented in Table 6, show that the alkyl polysaccharide surfactant compositions exhibit the desired properties over a range of temperatures ("T") and relative salinities ("RS"). In contrast, the other, comparative, nonionic surfactant compositions tested offer relatively poor performance, particularly at the higher temperatures and relative salinities.

TABLE 6

| surfactant | T (°C.) | RS | foam volume after (min.) 1 | 5 | 10 | 30 | 60 |
|---|---|---|---|---|---|---|---|
| a | 25 | 0.5 | 16.0 | 14.3 | 14.2 | 7.8 | 5.2 |
| a | " | 1.0 | 15.0 | 13.2 | 12.0 | 8.9 | 4.6 |
| a | " | 1.5 | 11.0 | 9.0 | 7.7 | 6.3 | 5.7 |
| b | " | 0.5 | >23.8 | >22.6 | >22.4 | >22.4 | 20.2 |
| b | " | 1.0 | >22.2 | 21.4 | 19.8 | 19.8 | 19.3 |
| b | " | 1.5 | >21.2 | 19.4 | 18.8 | 18.8 | 18.2 |
| c | " | 0.5 | 13.8 | 13.2 | 12.8 | 12.0 | 11.0 |
| c | " | 1.0 | 13.8 | 11.6 | 10.6 | 10.3 | 10.0 |
| c | " | 1.5 | 11.0 | 10.0 | 9.0 | 8.8 | 8.4 |
| d | " | 0.5 | 18.6 | 17.4 | 17.0 | 15.8 | 15.8 |
| d | " | 1.0 | 17.6 | 16.6 | 15.6 | 15.2 | 15.0 |
| d | " | 1.5 | 15.4 | 14.6 | 14.6 | 14.2 | 14.2 |
| i | " | 0.5 | 21.4 | 6.4 | 4.3 | 1.0 | — |
| i | " | 1.0 | >23.0 | 3.2 | 2.0 | 0.4 | — |
| i | " | 1.5 | 21.0 | 1.2 | 0.8 | 0.0 | — |
| j | " | 0.5 | 23.2 | 4.0 | 2.0 | 1.0 | — |
| j | " | 1.0 | >23.2 | 13.0 | 5.0 | 2.4 | — |
| j | " | 1.5 | 21.0 | 1.2 | 0.8 | 0.0 | — |
| k | " | 0.5 | >22.2 | >22.1 | >21.0 | >21.0 | 6.0 |
| k | " | 1.0 | 20.8 | 17.6 | 7.2 | 1.2 | 1.0 |
| k | " | 1.5 | 16.4 | 16.0 | 13.4 | 3.2 | 1.9 |
| l | " | 0.5 | 21.2 | 7.4 | 4.4 | 2.2 | — |
| l | " | 1.0 | 20.4 | 19.8 | 5.0 | 1.2 | — |
| l | " | 1.5 | 15.8 | 10.8 | 3.8 | 1.0 | — |
| m | " | 0.5 | >22.4 | 10.2 | 2.6 | 0.5 | — |
| m | " | 1.0 | 15.4 | 10.2 | 5.0 | 1.4 | — |
| m | " | 1.5 | 10.2 | 9.2 | 6.4 | 5.4 | — |
| a | 40 | 0.5 | 16.6 | 14.6 | 11.6 | 4.0 | 1.4 |
| a | " | 1.0 | 13.2 | 11.4 | 9.6 | 5.6 | 1.8 |
| a | " | 1.5 | 9.2 | 6.5 | 5.2 | 4.6 | 4.2 |
| b | " | 0.5 | >23.8 | >22.5 | >22.3 | 14.0 | 13.6 |
| b | " | 1.0 | >23.8 | >22.5 | >22.4 | 7.3 | 9.2 |
| b | " | 1.5 | >22.8 | >21.4 | 19.8 | 19.2 | 9.2 |
| c | " | 0.5 | 15.6 | 14.4 | 13.9 | 13.6 | 13.2 |
| c | " | 1.0 | 14.8 | 12.5 | 11.4 | 10.2 | 9.0 |
| c | " | 1.5 | 14.2 | 11.6 | 11.0 | 10.0 | 9.2 |
| d | " | 0.5 | >24.0 | >22.2 | >22.2 | >22.2 | 21.0 |
| d | " | 1.0 | >24.0 | 19.0 | 18.8 | 18.6 | 18.4 |
| d | " | 1.5 | 18.0 | 17.2 | 16.4 | 16.4 | 16.2 |
| i | " | 0.5 | >23.4 | 2.2 | 1.8 | 0.0 | — |
| i | " | 1.0 | >23.4 | 1.2 | 0.6 | 0.0 | — |
| i | " | 1.5 | 20.4 | 1.0 | 0.4 | 0.0 | — |
| j | 40 | 0.5 | 18.4 | 4.2 | 1.3 | 0.4 | — |
| j | " | 1.0 | 18.0 | 4.6 | 1.8 | 0.4 | — |
| j | " | 1.5 | 11.8 | 4.4 | 1.6 | 0.0 | — |
| k | " | 0.5 | >23.2 | 11.8 | 5.6 | 3.0 | — |
| k | " | 1.0 | >21.4 | 7.2 | 2.4 | 0.9 | — |
| k | " | 1.5 | 18.2 | 17.4 | 3.8 | 0.6 | — |
| l | " | 0.5 | 22.0 | 5.0 | 2.2 | 0.0 | — |
| l | " | 1.0 | 19.2 | 3.4 | 2.0 | 0.0 | — |
| l | " | 1.5 | 10.8 | 6.2 | 4.7 | 0.6 | — |
| m | " | 0.5 | >21.2 | 1.8 | 0.6 | 0.0 | — |
| m | " | 1.0 | 7.4 | 7.0 | 2.0 | 0.3 | — |
| m | " | 1.5 | 5.4 | 2.4 | 2.0 | 1.2 | — |
| a | 75 | 0.5 | 13.0 | 2.8 | 1.6 | 0.0 | 0.0 |
| a | " | 1.0 | 10.6 | 5.2 | 2.8 | 0.0 | 0.0 |
| a | " | 1.5 | 7.6 | 6.4 | 5.6 | 3.6 | 0.0 |
| b | " | 0.5 | >22.8 | 1.4 | 0.8 | 0.0 | 0.0 |
| b | " | 1.0 | >22.8 | 2.2 | 1.0 | 0.0 | 0.0 |
| b | " | 1.5 | >22.8 | 3.0 | 1.6 | 0.0 | 0.0 |
| c | " | 0.5 | 7.4 | 6.2 | 6.2 | 6.0 | 6.0 |
| c | " | 1.0 | 7.4 | 6.0 | 5.6 | 5.4 | 5.0 |
| c | " | 1.5 | 7.4 | 6.6 | 6.6 | 5.8 | 4.8 |
| d | " | 0.5 | >22.8 | >22.2 | 17.2 | 14.0 | 1.8 |
| d | " | 1.0 | >22.8 | >22.2 | 17.0 | 14.4 | 2.4 |

TABLE 6-continued

| surfactant | T (°C.) | RS | foam volume after (min.) | | | | |
|---|---|---|---|---|---|---|---|
| | | | 1 | 5 | 10 | 30 | 60 |
| d | " | 1.5 | 15.4 | 15.0 | 14.0 | 9.6 | 7.4 |
| i | " | 0.5 | 1.6 | 0.0 | 0.0 | 0.0 | — |
| i | " | 1.0 | 0.0 | 0.0 | 0.0 | 0.0 | — |
| i | " | 1.5 | 0.0 | 0.0 | 0.0 | 0.0 | — |
| j | " | 0.5 | 2.2 | 0.8 | 0.0 | 0.0 | — |
| j | " | 1.0 | 1.0 | 1.0 | 0.0 | 0.0 | — |
| j | " | 1.5 | 0.0 | 0.0 | 0.0 | 0.0 | — |
| k | " | 0.5 | 1.5 | 0.0 | 0.0 | 0.0 | — |
| k | " | 1.0 | 3.6 | 0.0 | 0.0 | 0.0 | — |
| k | " | 1.5 | 0.0 | 0.0 | 0.0 | 0.0 | — |
| l | " | 0.5 | 0.0 | 0.0 | 0.0 | 0.0 | — |
| l | " | 1.0 | 1.0 | 0.0 | 0.0 | 0.0 | — |
| l | " | 1.5 | 0.0 | 0.0 | 0.0 | 0.0 | — |

I claim as my invention:

1. A process for enhancing control over the mobility of fluids in a substantially oil-free zone of a subterranean formation, which comprises introducing into the zone a composition comprising (a) water, (b) a component selected from the group consisting of supercritical carbon dioxide and gaseous nitrogen, carbon dioxide and $C_1$ to $C_3$ hydrocarbons, and mixtures thereof, and (c) one or more polysaccharide surfactants of the formula $RO(R^1O)_xSacc_z$, wherein R is a monovalent organic radical having a carbon number in the range from about 7 to 24, $R^1$ represents a divalent hydrocarbon radical containing from about 2 to about 4 carbon atoms, x is a number having an average value in the range from 0 to about 12.0, and $Sacc_z$ represents an average number z between about 0.7 and 10.0 of moieties derived from reducing saccharides containing 5 or 6 carbon atoms.

2. The process of claim 1, wherein the composition is introduced into the substantially oil-free zone by first injecting into the zone an aqueous solution of the one or more polysaccharide surfactants followed by injecting the component selected from the group consisting of supercritical carbon dioxide and gaseous nitrogen, carbon dioxide and $C_1$ to $C_3$ hydrocarbons, and mixtures thereof.

3. The process of claim 1, wherein R in the surfactant formula represents an alkyl or alkylphenyl radical having a carbon number in the range from about 8 to 20, Sacc in the formula represents a glucoside moiety and z has an average value between about 1.0 and 6.0.

4. The process of claim 3, wherein $R^1O$ in the formula represents an oxyethylene radical, and x in the formula is between about 2.5 and 8.0.

5. The process of claim 3, wherein x in the formula is zero.

6. The process of claim 5, wherein R is an alkyl radical having a carbon number in the range from about 9 to 15 and z is a number having an average value of from about 1.3 to 4.0.

7. The process of claim 1, wherein the composition contains between about 0.1 and 2 percent by weight of the polysaccharides, calculated on water.

8. The process of claim 7, wherein the content of component (b) in the composition is adjusted for the desired degree of mobility control.

9. The process of claim 7, wherein the volume ratio of component (b) to water and surfactant in the composition is in the range from about 0.1:1 to 100:1.

10. The process of claim 6, wherein the composition contains between about 0.1 and 2 percent by weight of polysaccharide surfactants, calculated on water.

11. The process of claim 10, wherein the content of component (b) in the composition is adjusted for the desired degree of mobility control.

12. The process of claim 10, wherein volume ratio of component (b) to water and surfactant in the composition is in the range from about 0.1:1 to 100:1.

13. The process of claim 1, wherein the composition contains at between about 0.and 2 percent by weight of the polysaccharides, calculated on water.

14. An improved process for the recovery of oil from a subterranean formation having one or more aqueous zones, substantially free of oil, and one or more zones of high oil saturation, which comprises injecting into the formation a drive fluid which has mobility into and through the high oil saturation zones, wherein the improvement comprises
(a) a step for introducing into one or more of the aqueous zones of the formation a composition comprising (i) water, (ii) a component selected from the group consisting of supercritical carbon dioxide and gaseous nitrogen, carbon dioxide and $C_1$ to $C_3$ hydrocarbons, and mixtures thereof, and (iii) one or more polysaccharide surfactants of the formula $RO(R^1O)_xSacc_z$, wherein R is a monovalent organic radical having a carbon number in the range from about 7 to 24, $R^1$ represents a divalent hydrocarbon radical containing from about 2 to about 4 carbon atoms, x is a number having an average value in the range from 0 to about 12.0, and $Sacc_z$ represents an average number z between about 0.7 and 10.0 of moieties derived from reducing saccharides containing 5 or 6 carbon atoms, which is followed by
(b) a step for injecting the drive fluid into the formation.

15. The process of claim 14, wherein the composition is introduced into the substantially oil-free zone by first injecting into the zone an aqueous solution of the one or more polysaccharide surfactants followed by injecting the component selected from the group consisting of supercritical carbon dioxide and gaseous nitrogen, carbon dioxide and $C_1$ to $C_3$ hydrocarbons, and mixtures thereof.

16. The process of claim 15, wherein the drive fluid is the same fluid as component (ii) of the composition.

17. The process of claim 16, wherein R in the surfactant formula represents an alkyl radical having a carbon number in the range from about 8 to 10, Sacc in the formula represents a glucoside moiety and z has an average value between about 1.0 and 6.0.

18. The process of claim 17, wherein $R^1O$ in the formula represents an oxyethylene radical, and x in the formula is between about 2.5 and 8.0.

19. The process of claim 17, wherein x in the formula is zero.

20. The process of claim 19, wherein R is an alkyl radical having a carbon number in the range from about 9 to 15 and z is a number having an average value of from about 1.3 to 4.0.

21. The process of claim 20, wherein the composition contains between about 0.1 and 2 percent by weight of polysaccharide surfactants, calculated on water.

22. The process of claim 21, wherein volume ratio of component (b) to water and surfactant in the composition is in the range from about 0.1:1 to 100:1.

* * * * *